(12) United States Patent
Paran et al.

(10) Patent No.: US 10,587,760 B1
(45) Date of Patent: Mar. 10, 2020

(54) SYSTEM, METHOD, AND COMPUTER PROGRAM FOR PROVIDING DEVICE CENTRIC PAYMENT AUTHORIZATION IN ROAMING CONDITIONS

(71) Applicant: Amdocs Development Limited, Limassol (CY)

(72) Inventors: Eran Yosef Paran, Hod Hasharon (IL); Shmuel Ur, Shorashim (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 16/124,002

(22) Filed: Sep. 6, 2018

(51) Int. Cl.
*H04M 15/00* (2006.01)
*H04W 48/04* (2009.01)
*H04L 9/06* (2006.01)

(52) U.S. Cl.
CPC .......... *H04M 15/60* (2013.01); *H04L 9/0637* (2013.01); *H04M 15/48* (2013.01); *H04M 15/66* (2013.01); *H04W 48/04* (2013.01)

(58) Field of Classification Search
CPC ...... H04M 15/60; H04M 15/48; H04M 15/61; H04M 15/8038
See application file for complete search history.

(56) References Cited

U.S. PATENT DOCUMENTS

| 2014/0357219 A1* | 12/2014 | Nicolaescu | H04M 15/8038 455/406 |
| 2018/0189755 A1* | 7/2018 | Kilpatrick | G06Q 20/102 |
| 2018/0343339 A1* | 11/2018 | Lotter | H04L 43/0876 |

* cited by examiner

*Primary Examiner* — Joshua L Schwartz
(74) *Attorney, Agent, or Firm* — Zilka-Kotab, PC

(57) ABSTRACT

A system, method, and computer program product are provided for providing device centric payments in roaming conditions. In operation, a device requests service from a visiting communication network. The device provides an identity associated with the device. The device records an amount of service utilized (e.g. utilizing blockchain technology, etc.). The device submits the amount of service utilized to the visiting network or to a blockchain, such that the visiting network is capable of determining whether the amount of service utilized recorded by the device is similar to an amount of service usage measured by the visiting network (e.g. when an established credit limit available has been utilized, etc.).

12 Claims, 7 Drawing Sheets

US 10,587,760 B1

SYSTEM, METHOD, AND COMPUTER PROGRAM FOR PROVIDING DEVICE CENTRIC PAYMENT AUTHORIZATION IN ROAMING CONDITIONS

FIELD OF THE INVENTION

The present invention relates to providing communication services to a device while roaming, and more particular to providing device centric payments in roaming conditions.

BACKGROUND

When a device (e.g. a phone, etc.) moves from a home network to a visiting network, the device obtains service from the visiting network (e.g. data service, etc.). The techniques used to date to accomplish this have limitations.

There is thus a need for addressing these and/or other issues associated with the prior art.

SUMMARY

A system, method, and computer program product are provided for providing device centric payments in roaming conditions. In operation, a device requests service from a visiting communication network. The device provides an identity associated with the device. The device records an amount of service utilized (e.g. utilizing blockchain technology, etc.). The device submits the amount of service utilized to the visiting network or to a blockchain, such that the visiting network is capable of determining whether the amount of service utilized recorded by the device is similar to an amount of service usage measured by the visiting network (e.g. when an established credit limit available has been utilized, etc.).

DETAILED DESCRIPTION

Figure 1:
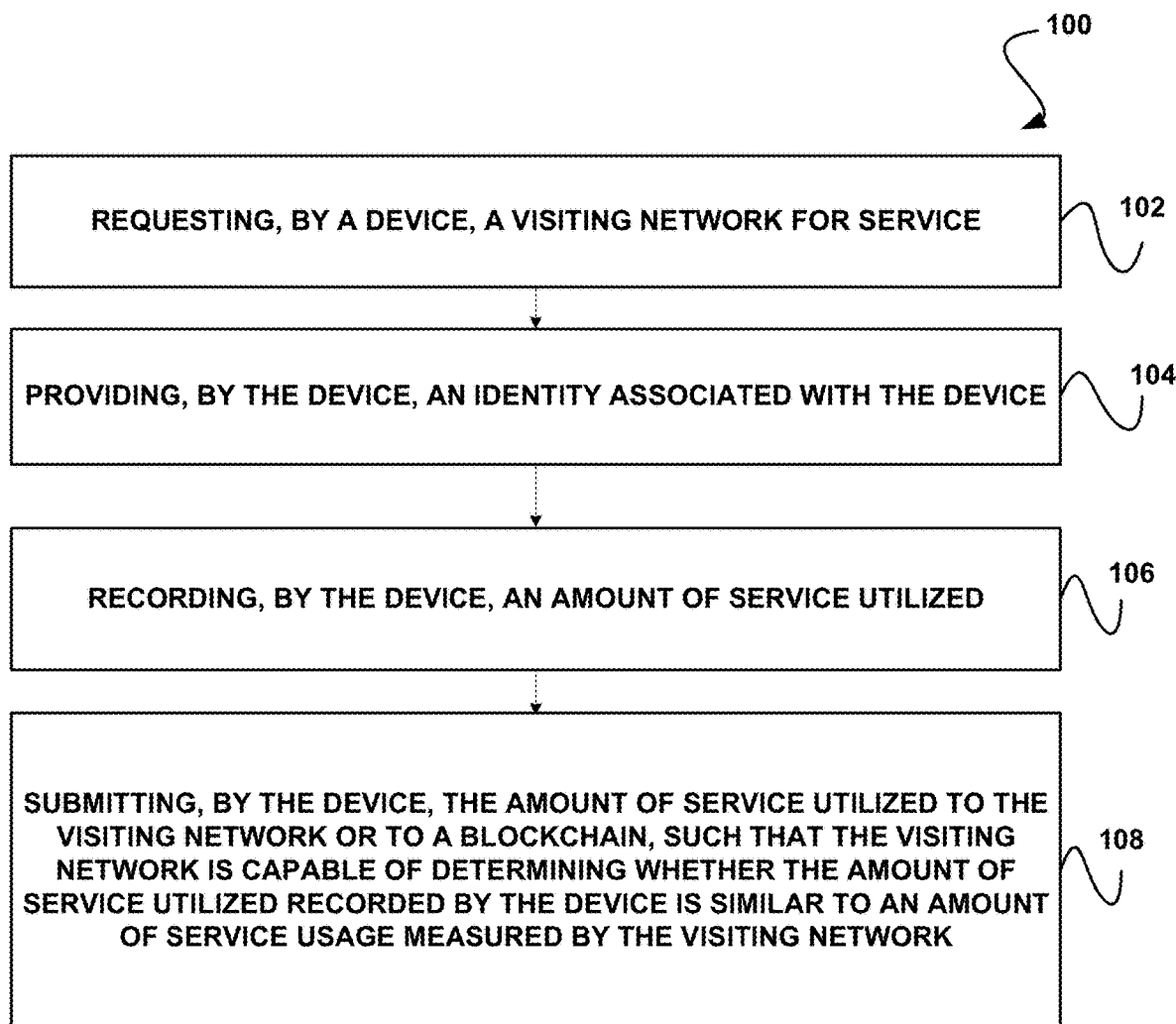
FIG. 1 illustrates a method for providing device centric payments in roaming conditions, in accordance with one embodiment.

FIG. 1 illustrates a method 100 for providing device centric payments in roaming conditions, in accordance with one embodiment.

In operation, a device requests service from a visiting communication network. See operation 102. In this case, the device is in a roaming condition. The device may include any device capable of communicating with a communication network, such as a mobile phone, a computer (e.g. a tablet computer, etc.), and/or various other devices. The visiting communication network may include any network that is not a home network associated with the device. Moreover, the visiting network may include any type of communication network (e.g. LTE, etc.). The service requested by the device may include data and/or voice service, etc.

The device provides an identity associated with the device and, in one embodiment, the device may provide an identity of at least one home network associated with the device. See operation 104. The device identity may include any identity capable of being used to identify the device. The identity of the home network may include any identity capable of identifying a home network associated with the device. In some cases, the device identity may be used to identify the home network and thus the device would not need to provide an identity of a home network.

In one embodiment, the device may receive a request for proof of credit from the visiting network. In this case, the device may provide the proof of credit to the visiting network.

Further, in one embodiment, the device may identify an established credit limit available from the visiting network. This may be established in a negotiation process. The credit limit may include a data limit and/or a money limit, etc.

Further, the device records an amount of service utilized (e.g. utilizing blockchain technology, etc.). See operation 106. For example, as the device utilizes data, the device will log a record of usage (e.g. in a blockchain node, etc.). The device submits the amount of service utilized to either the visiting network and/or to a blockchain (accessible by the visiting network), such that the visiting network is capable of determining whether the amount of service utilized recorded by the device is similar to an amount of service usage measured by the visiting network. See operation 108. In one embodiment, the visiting network may make this determination when an established credit limit available has been utilized.

The visiting network determines (e.g. via internal calculation, etc.) whether the amount of service utilized recorded by the device is similar to an amount of service usage measured by the visiting network when the established credit limit available has been utilized.

If the amount of service utilized recorded by the device is similar to or larger than the amount of service usage measured by the visiting network, the device may receive additional service from the visiting network (i.e. the visiting network may continue to provide service to the device). If the amount of service utilized recorded by the device is less than the amount of service usage measured by the visiting network, the device may not receive additional service from the visiting network (i.e. the visiting network may halt service to the device).

Thus, the visiting network may determine whether there is an inconsistency in the logged usage amounts. In one embodiment, the device may send a receipt to the visiting network such that the visiting network is able to calculate whether the amount of service utilized recorded by the device is similar to an amount of service usage measured by the visiting network. In this case, the device may receive a result of the calculation from the visiting network to identify whether the amount of service utilized recorded by the device is similar to an amount of service usage measured by the visiting network.

Further, in one embodiment, the device may record the amount of service utilized in a blockchain accessible by one or more of the home network associated with the device and the visiting network. Additionally, the amount of service usage measured by the visiting network may be stored in a blockchain accessible by the at least one home network associated with the device and the visiting network. In this case, if there is an inconsistency between the amount of service utilized recorded by the device in the blockchain and the amount of service usage measured by the visiting network that is stored in the blockchain, an alert may be communicated to the at least one home network associated with the device and to the visiting network. Furthermore, the visiting network may halt service to the device if there is an inconsistency between the amount of service utilized recorded by the device in the blockchain and the amount of service usage measured by the visiting network that is stored in the blockchain. The visiting network may conduct a reconciliation action to the service if the inconsistency is remedied.

It should be noted that the method 100 may be implemented utilizing various systems, hardware, software, applications, user interfaces, etc., as dictated by the implementer. For example, the device/system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

When a device (e.g. a phone, etc.) moves from a home network to a visiting network, the device obtains service from the visiting network. There are two common ways this is accomplished. The most common is that the device identifies itself to the visiting network and provides information about the home network to the visiting network. The visiting network, based on prior agreements with the home network, hosts the visiting device and provides communication services. The device, in its communication (for data and internet based services), goes through the visiting network to the home network and from there to the internet. From there, communication goes back to the home network, to the visiting network and to the device. The reason for this arrangement is that this way the home network knows how much communication there was and can pay the visiting network accordingly, and charge the device accordingly. However, this means that there is a lot of communication around the world, from the visiting network to the home network and back, and statistically, also longer communication from the home network to the content than from the visiting network (as much interesting content is local). This means that a lot of extra communication is needed leading to much worse latency.

In the context of data, the visiting network creates a link to the home network and all communication goes through this link. Again, if the device is looking for local information, this means a huge amount of overhead. The entire reason for this overhead is that this way the home network can determine exactly how much communication is provided by the visiting network.

Conversely, for a local breakout architecture model, where the subscriber's data is serviced by the network they are visiting, delivers more efficient routing in terms of bandwidth and latency. The visited network has complete control over the packet gateway (PGW).

In the case of the local breakout architecture model, the home network owner loses control of their customer and has no role in delivering services to them. This local breakout architecture model is used when there is a trusted relationship between the two respective operators and is recommended by the GSMA as the best architecture for VoLTE roaming.

A third slightly more efficient option, is for the device to have contracts negotiated with many providers. So, as a customer travels abroad, the customer first buys services at locations likely to be used. The communication this way is fast, device to local provider/visiting network and content access. There is lower latency and a lot less communication required. The drawback of this solution is that the device needs to negotiate contracts with many providers. If there is a visiting network where the device is located and no associated contract, this method will not work.

The new techniques and systems described herein allow negotiation of a contract with only with one provider with the ability of a user to roam locally without going through a device provider. In this case, the home network is not part of the communication, yet the payment can be measured and verified by the home network.

In operation, a home network can install software on a device used for communicating with a visiting network, so that the device can, without the home network, get the data service enablement from the visiting network and solve the payment problem in a trusted way, such that the home network can verify the service the device received from a visiting network.

Thus, the device will have software from an associated home network. This secure software may allow the device to implement various functionality and properties, such as: measuring the communication performed and comparing the measurement with a measurement from the visiting network; sending a signed proof of communication to the visiting network that the visiting network can read but not write or modify (using private/public key), which the visiting network may use later to collect money; and reporting communication, in encrypted form, to the home network. The software may also allow the device to include payment authorizations, such that credit may be given by the home network but such that such authorizations cannot be controlled by the device. The software may be installed by the home network as encrypted and immutable software and paired be with the device.

In one embodiment, both the device and the visiting network PGW can write the logs of counted data consumed by the device into blockchain nodes that are visible to both home and visiting networks. If there is a significant inconsistency between the two logs, an alert may be raised to both parties and reconciliation can take place or a decision to stop servicing the device may be made.

Writing the consumed data to a blockchain ledger can provide transparency and ensure data is not changed by any party. The local network can also monitor the blockchain and make a decision based on that monitoring such as informing the visiting network that there is no credit for the device anymore.

In operation, the device searches for the list of visiting networks around it. The device chooses a visiting network according the policy chosen by its home network (which may be impacted by the contract between the visiting network and device home network, as well as quality of service, etc.). All visiting networks that compete for providing the service to the device do so for free.

Further, the device sends its identity and home network identity to the visiting network. In one embodiment, in the case the device only has one home network, the device identity may be enough, as home network information may be found in a table by the visiting network. The visiting network adds the location of the device to the global table so that it may receive calls.

The visiting network checks the credit limit associated with the device and starts providing service to the device. The amount of service provided is measured continuously by both the device and the visiting network. Whenever the device or the visiting network reaches a chunk of some agreed size, the device checks with the visiting network to determine whether the amount it recorded is similar to that recorded by the visiting network (or the device may report how much it recorded).

If the amount the device recorded (which is how the visiting network will get paid) is similar to or larger than that which the device recorded, the visiting network will continue to provide service. The visiting network now has a record from the device of how much communication the device received, which can be used with the device home provider. The visiting network may obtain such record for relatively small chunk of communications, depending on implementation.

If the device records a lot less service usage than the visiting network, the visiting network may decide not to continue with the service. If the device does not reply to a request for a record, or is out of credit, the visiting network may stop providing it with service.

Thus, the system and techniques described herein may be described in three stages. In the first stage, the provider installs software on the client device. In the second stage, when roaming, the device chooses the visiting network with which to work. There is no charging involved. The device may look for the visiting network with which the home network has an agreement.

The third stage is described in more detail with reference to FIGS. 2-5.

Figure 2:
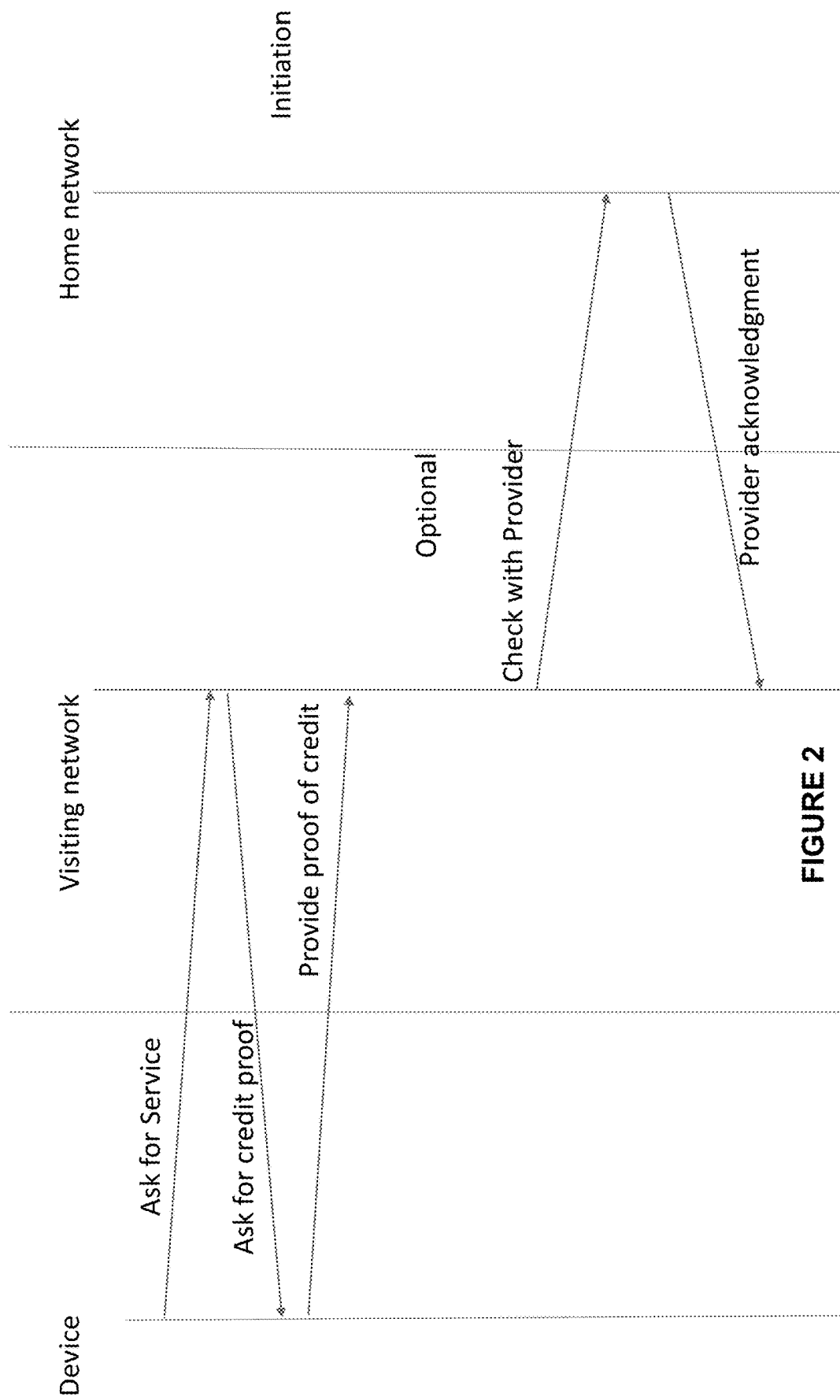
FIG. 2 shows a system flow diagram illustrating a device requesting a visiting network for service, in accordance with one embodiment.

FIG. 2 shows a system flow diagram 200 illustrating a device requesting a visiting network for service, in accordance with one embodiment. As an option, the system flow diagram 200 may be implemented in the context of the details of the previous figure and/or any subsequent figure(s). Of course, however, the system flow diagram 200 may be implemented in the context of any desired environment. Further, the aforementioned definitions may equally apply to the description below.

As shown in FIG. 2, the device asks the visiting network for service. The visiting network asks for proof of credit. The device, using its home network software, provides proof of credit. Optionally, the visiting network may check with the home network for proof of credit. After this step, the visiting network is willing to provide service and knows the credit limit of the device or how much communication, at a maximum, it can provide.

Figure 3:
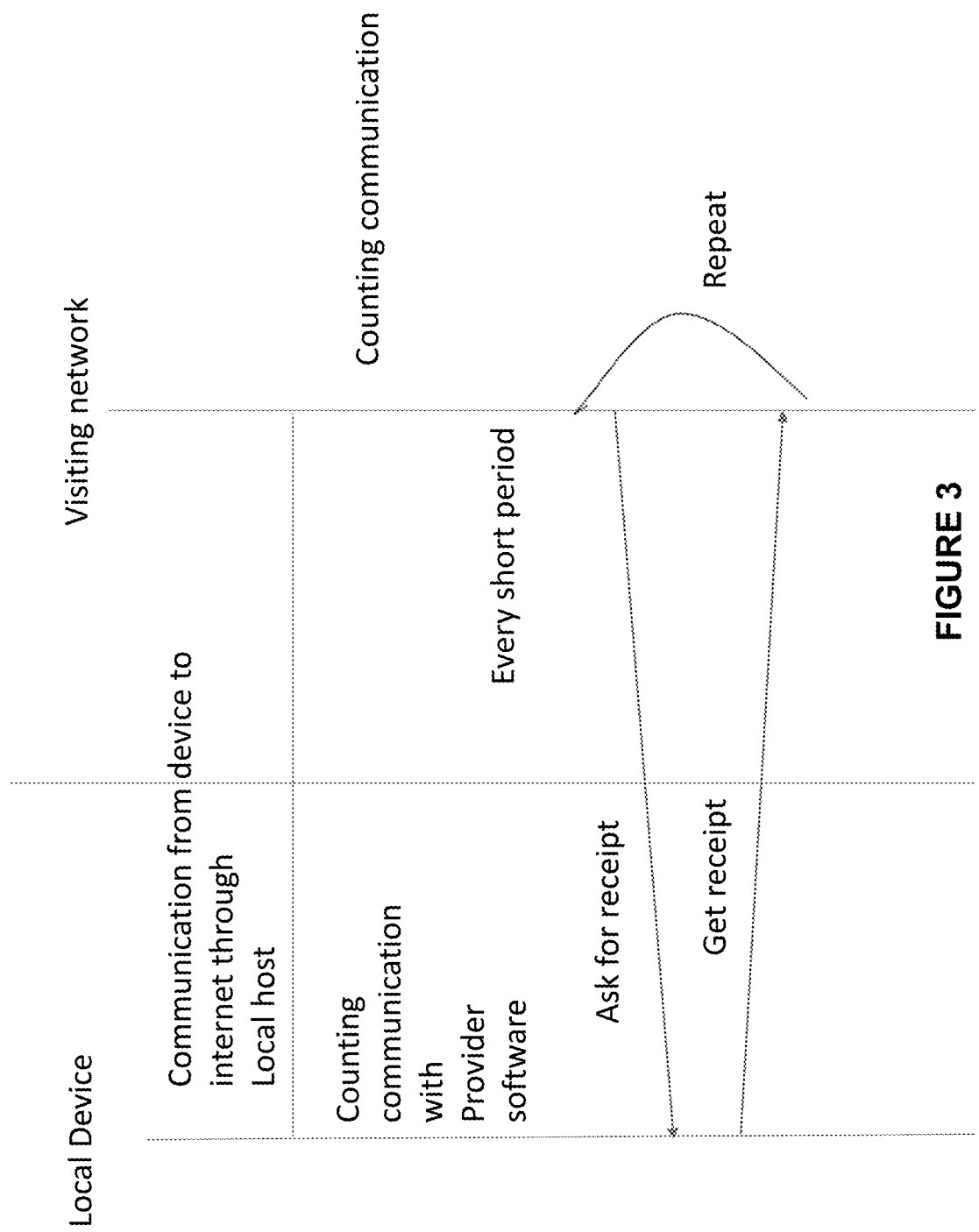
FIG. 3 shows a system flow diagram illustrating a device receiving service from a visiting network, in accordance with one embodiment.

FIG. 3 shows a system flow diagram 300 illustrating a device receiving service from a visiting network, in accordance with one embodiment. As an option, the system flow diagram 300 may be implemented in the context of the details of the previous figures and/or any subsequent figure(s). Of course, however, the system flow diagram 300 may be implemented in the context of any desired environment. Further, the aforementioned definitions may equally apply to the description below.

As shown in FIG. 3, after establishing communication, in parallel with the communication from the device to the internet, etc., through the visiting network, the device and the visiting network may monitor service usage. In this case, every designated short period of time, the visiting network may request a receipt from the device for some amount of communication. A receipt is a document signed cryptographically by the device that the visiting network can read, but not write to, indicating that the network provided to the device a type and amount of communication service. The receipt may be used by the visiting network when asking for payment from the home network.

If the visiting network does not receive a receipt, or receives a receipt for the wrong amount (from the network perspective), the visiting network may stop communication/service. If according to the visiting network the device runs out of credit, the visiting network may stop communication. Upon request, the device sends receipt indicating the communication it had.

Both the device and the visiting network may communicate with the home network. The visiting network sends the receipts it receives from the device to receive payment. In one embodiment, the device may send the receipt (encoded) so that the provider will know how much service it received, as a backup.

Figure 4:
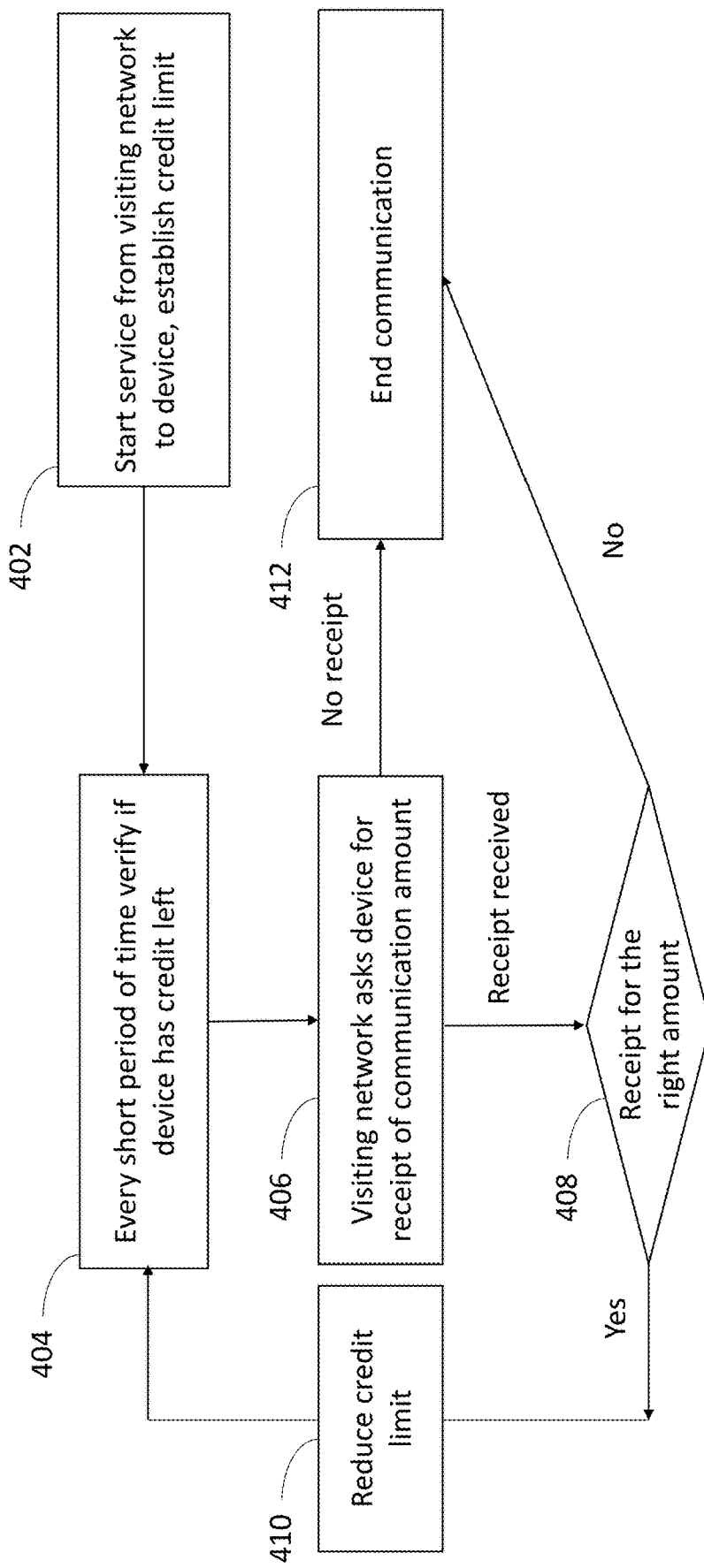
FIG. 4 shows a flow diagram illustrating a device receiving service from a visiting network, in accordance with another embodiment.

FIG. 4 shows a flow diagram 400 illustrating a device receiving service from a visiting network, in accordance with one embodiment. As an option, the flow diagram 400 may be implemented in the context of the details of the previous figures and/or any subsequent figure(s). Of course, however, the flow diagram 400 may be implemented in the context of any desired environment. Further, the aforementioned definitions may equally apply to the description below.

In operation, service is started from a visiting network to a device and a credit limit is established. See operation 402. Every short period of time, the device and/or the visiting network verifies whether the device has credit left. See operation 404. The visiting network asks the device for receipt of the logged communication amount. See operation 406. The visiting network determines whether the receipt is for the correct amount (based on the network logs). See operation 408. If the receipt is for the correct amount, the network reduces the credit limit for the device appropriately. See operation 410. If the receipt is not for the correct amount, the visiting network ends service for the device. See operation 412.

Figure 5:
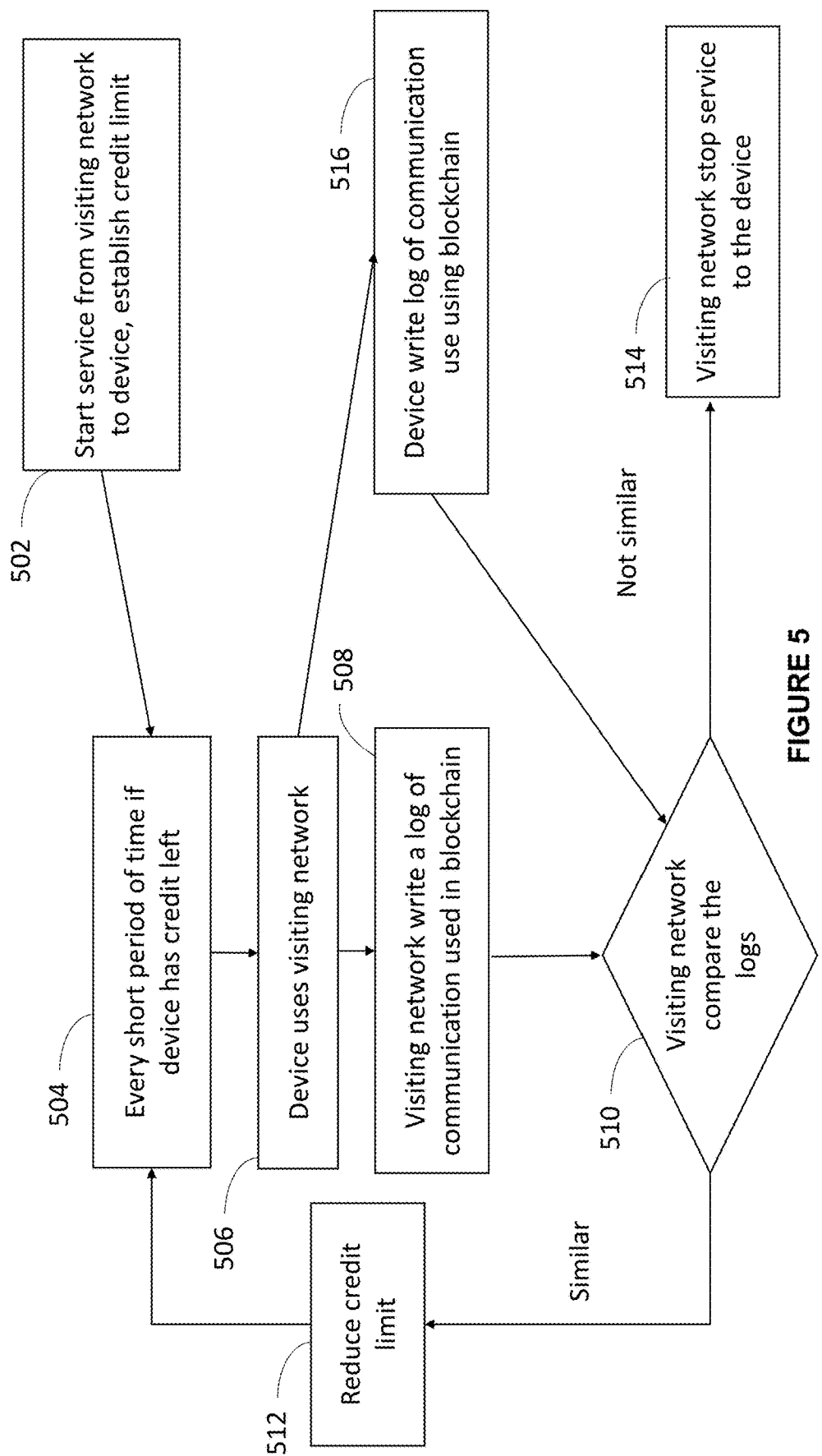
FIG. 5 shows a flow diagram illustrating a device receiving service from a visiting network, in accordance with another embodiment.

FIG. 5 shows a flow diagram 500 illustrating a device receiving service from a visiting network, in accordance with one embodiment. As an option, the flow diagram 500 may be implemented in the context of the details of the previous figures and/or any subsequent figure(s). Of course, however, the flow diagram 500 may be implemented in the context of any desired environment. Further, the aforementioned definitions may equally apply to the description below.

In operation, service is started from a visiting network to a device and a credit limit is established. See operation 502. Every short period of time, the device and/or the visiting network verifies whether the device has credit left. See operation 504. The device uses the visiting network. See operation 506. The visiting network writes a log of communication utilizing blockchain technology. See operation 508. Additionally, the device writes a log of communication utilizing blockchain technology. See operation 516. Periodically, the visiting network compares the log of the device with its own log. See operation 510. If the logs indicate a similar amount, the visiting network reduces the credit limit for the device appropriately. See operation 512. If the logs do not indicate a similar amount, the visiting network stops service to the device. See operation 514.

Figure 6:
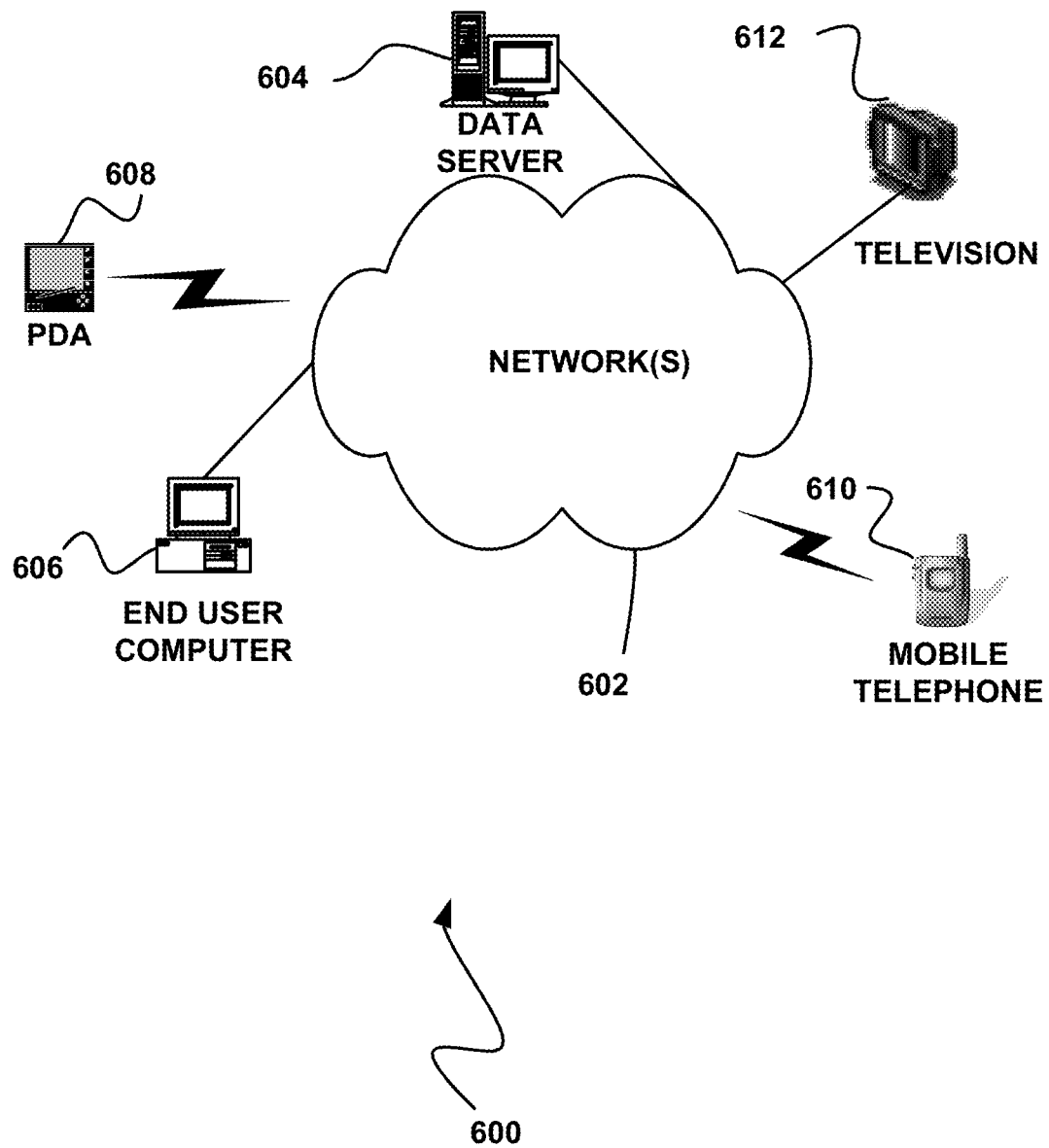
FIG. 6 illustrates a network architecture, in accordance with one possible embodiment.

FIG. 6 illustrates a network architecture 600, in accordance with one possible embodiment. As shown, at least one network 602 is provided. In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 604 and an end user computer 606 may be coupled to the network 602 for communication purposes. Such end user computer 606 may include a desktop computer, lap-top computer, and/or any other type of logic. Still yet, various other devices may be coupled to the network 602 including a personal digital assistant (PDA) device 608, a mobile phone device 610, a television 612, etc.

Figure 7:
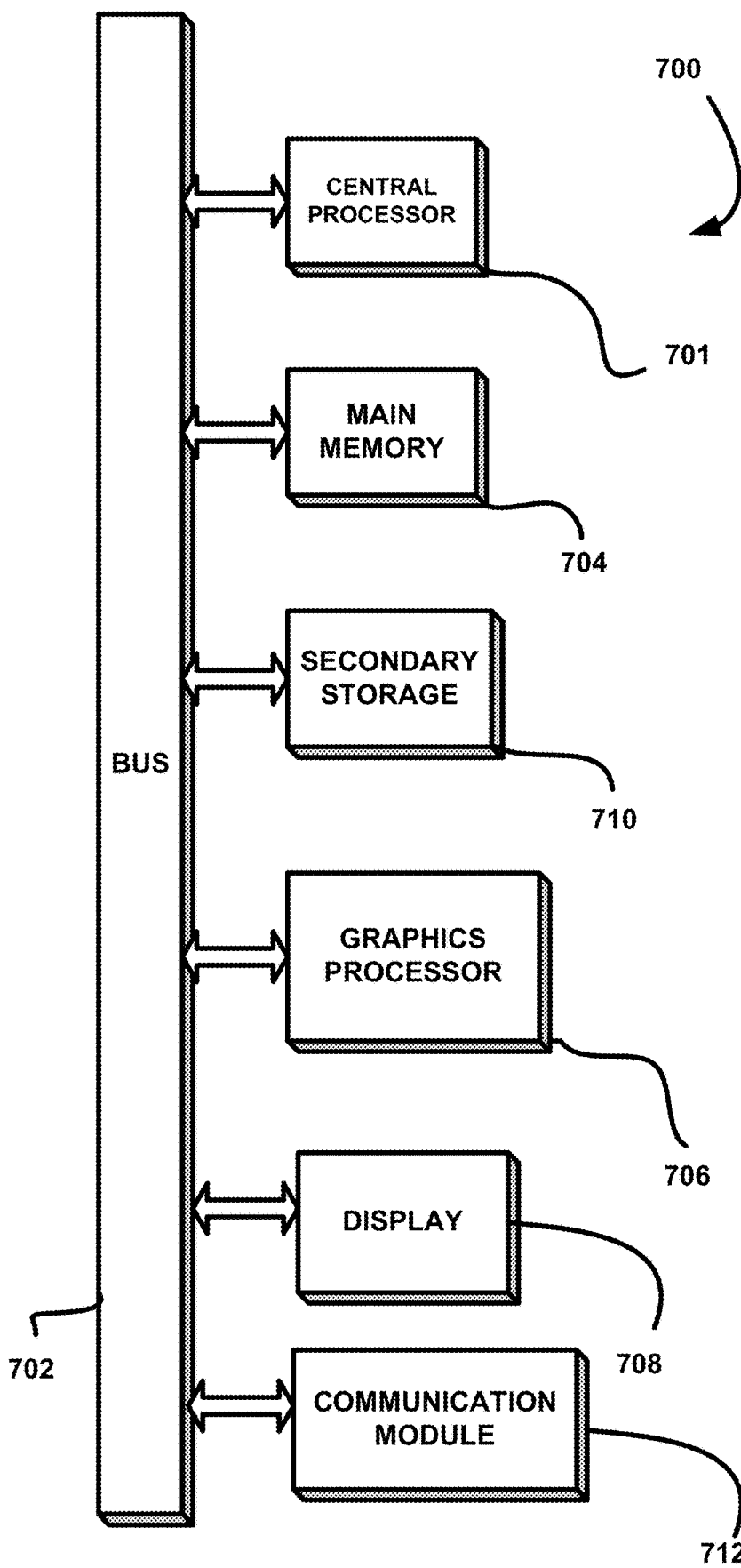
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. Of course, the system 700 may be implemented in any desired environment.

As shown, a system 700 is provided including at least one central processor 701 which is connected to a communication bus 702. The system 700 also includes main memory 704 [e.g. random access memory (RAM), etc.]. The system 700 also includes a graphics processor 706 and a display 708.

The system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 704, the secondary storage 710, and/or any other memory, for that matter. Such computer programs, when executed, enable the system 700 to perform various functions (as set forth above, for example). Memory 704, storage 710 and/or any other storage are possible examples of non-transitory computer-readable media.

The system 700 may also include one or more communication modules 712. The communication module 712 may be operable to facilitate communication between the system 700 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
    requesting, by a device, a visiting network for service;
    providing, by the device, an identity associated with the device;
    recording, by the device, an amount of service utilized; and
    submitting, by the device, the amount of service utilized to a blockchain accessible by at least one home network associated with the device and the visiting network, such that the visiting network is capable of determining whether the recorded amount of service utilized by the device is similar to an amount of service usage measured by the visiting network;
    wherein the amount of service usage measured by the visiting network is stored in the blockchain accessible by the at least one home network associated with the device and the visiting network.

2. The method of claim 1, wherein the device provides an identity of the at least one home network associated with the device.

3. The method of claim 1, wherein if there is an inconsistency between the recorded amount of service utilized by the device in the blockchain and the amount of service usage measured by the visiting network that is stored in the blockchain, an alert is communicated to the at least one home network associated with the device and to the visiting network.

4. The method of claim 3, wherein the visiting network halts service to the device if there is an inconsistency between the recorded amount of service utilized by the device in the blockchain and the amount of service usage measured by the visiting network that is stored in the blockchain.

5. The method of claim 4, wherein the visiting network conducts a reconciliation action to the service if the inconsistency is remedied.

6. The method of claim 1, wherein the visiting network determines if there is an inconsistency between the recorded amount of service utilized by the device in the blockchain and the amount of service usage measured by the visiting network that is stored in the blockchain.

7. A computer program product embodied on a non-transitory computer readable medium, comprising computer code for:
    requesting, by a device, a visiting network for service;
    providing, by the device, an identity associated with the device;
    recording, by the device, an amount of service utilized; and
    submitting, by the device, the amount of service utilized to a blockchain accessible by at least one home network associated with the device and the visiting network, such that the visiting network is capable of determining whether the recorded amount of service utilized by the device is similar to an amount of service usage measured by the visiting network;
    wherein the amount of service usage measured by the visiting network is stored in the blockchain accessible by the at least one home network associated with the device and the visiting network.

8. The computer program product of claim 7, wherein the device provides an identity of the at least one home network associated with the device.

9. The computer program product of claim 7, wherein if there is an inconsistency between the recorded amount of service utilized by the device in the blockchain and the amount of service usage measured by the visiting network that is stored in the blockchain, an alert is communicated to the at least one home network associated with the device and to the visiting network.

10. The computer program product of claim 9, wherein the visiting network halts service to the device if there is an inconsistency between the recorded amount of service utilized by the device in the blockchain and the amount of service usage measured by the visiting network that is stored in the blockchain.

11. The computer program product of claim 10, wherein the visiting network conducts a reconciliation action to the service if the inconsistency is remedied.

12. A device, comprising one or more processors, operable for:
    requesting, by the device, a visiting network for service;
    providing, by the device, an identity associated with the device;

recording, by the device, an amount of service utilized; and submitting, by the device, the amount of service utilized to a blockchain accessible by at least one home network associated with the device and the visiting network, such that the visiting network is capable of determining whether the recorded amount of service utilized by the device is similar to an amount of service usage measured by the visiting network;

wherein the amount of service usage measured by the visiting network is stored in the blockchain accessible by the at least one home network associated with the device and the visiting network.

\* \* \* \* \*